United States Statutory Invention Registration [19]

[11] Reg. Number: H477

Barger et al. [43] Published: Jun. 7, 1988

[54] MONOLAYER-FORMING SUBSTITUTED PHTHALOCYANINE COMPOUNDS AND METHOD OF PREPARATION THEREOF

[75] Inventors: William R. Barger, Fort Washington; Neldon L. Jarvis, Joppa, both of Md.; Arthur W. Snow, Alexandria; Henry Wohltjen, Burke, both of Va.

[73] Assignee: United States of America, Washington, D.C.

[21] Appl. No.: 767,925

[22] Filed: Aug. 21, 1985

[51] Int. Cl.[4] ..... C09B 47/30; C09B 47/04

[52] U.S. Cl. ..... 540/140; 540/122

[58] Field of Search ..... 540/122, 140

[56] References Cited

U.S. PATENT DOCUMENTS

| | | | |
|---|---|---|---|
| 2,290,906 | 7/1942 | Coffey et al. | 540/140 |
| 2,456,274 | 12/1948 | Gutzwiller | 540/140 |
| 3,981,734 | 9/1976 | Cabut et al. | 540/140 X |
| 4,606,859 | 8/1986 | Duggan et al. | 540/140 X |

FOREIGN PATENT DOCUMENTS 2455675 5/1975 Fed. Rep. of Germany .

*Primary Examiner*—John F. Terapane
*Assistant Examiner*—J. E. Thomas
*Attorney, Agent, or Firm*—John L. Forrest

[57] ABSTRACT

The invention relates to phthalocyanine compounds, and more particularly to the preparation of aryloxy, arylthio, alkyloxy, and alkylthio phthalocyanine compounds and their subsequent incorporation into semiconducting thin films by the Langmuir-Blodgett technique.

18 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MONOLAYER-FORMING SUBSTITUTED PHTHALOCYANINE COMPOUNDS AND METHOD OF PREPARATION THEREOF

BACKGROUND OF THE INVENTION

This invention relates generally to phthalocyanine compounds, and more particularly to the preparation of aryloxy, arylthio, alkyloxy, and alkylthio phthalocyanine compounds and their subsequent incorporation into semiconducting thin films by the Langmuir-Blodgett technique.

Phthalocyanine, or tetrabenzetraazaporphyrin, compounds are crystalline molecular substances characterized by intense color, high thermal oxidative stability, and extreme insolubility. They display properties such as electrical conductivity, electrical switching between conductive states, photovoltaic effects, oxidative catalytic activity, and electrochromism. The electrical properties of these compounds can change in response to the presense of chemical vapors, electromagnetic radiation, and electrical potential.

However, these compounds must typically be formed into thin layers before they can be used in micro electronic devices. To the extent that these layers are not of optimal thickness or are otherwise imperfect or disorderly, the usefulness of phthalocyanine-based electronic devices is degraded. Prior art attempts at phthalocyanine film formation worked around the problem of the low solubility of phthalocyanine by using evaporative or mechanical film formation techniques. The present invention takes a different approach: it discloses how phthalocyanine can be modified to become soluble, while retaining desirable electrical properties. The modification is accomplish without modifying the carbon skeleton of phtalocyanine. Such modification involves complicated chemistry and greatly increases manufacturing expense.

PRIOR ART

Prior art phthalocyanine films have not achieved a maximum degree of orderliness, and thus, desirable electrical properties, due to the methods by which they were made. These methods have included vacuum sublimation, spraying of a fine suspension, dispersion in a polymeric binder, and mechanical rubbing, all of which involve procedures of questionable reproducability. The variables difficult to control include the thickness and uniformity of the films, and the size and distribution of crystallites within the films.

An example of mechanical film formation is seen in the Frey patent, U.S. Pat. No. 4,381,922, where the phthalocyanines are pressed into a film by the application of pressure in the range of 2 to 10 tons/cm. Alternatively, Frey caused a suspension, as opposed to a solution, of phthalocyanine particles to be painted onto a surface. Films formed by either of these techniques are disorderly because they contain grains of phthalocyanine material. Electrical properties of the film layer depend upon the nature and quality of the mechanical contact between the grains of material.

An example of an electrical device formed from an evaporated layer of phthalocyanine is seen in the Robinson U.S. Pat. No. 4,350,660. The problem with evaporated-layer devices is that it is difficult to regulate the rate of evaporation onto the surface, as well as the nature of crystal nucleation and formation on the surface after deposition. The orderliness of the crystalline layer is highly dependent upon the fine structure of the surface upon which the layer is deposited, and a host of other factors. Typically, the surface is composed of a multitude of crystals of uncertain and varying size. The electrical properties of the device depend upon the variable nature of these crystals as well as upon the nature of the mechanical contact among the crystals.

Carbon-substituted phthalocyanines are old in the art, and can be used to produce Langmuir-Blodgett films. However, these compounds are expensive and difficult to make because they involve modification of the carbon skeleton of phthalocyanine. See *Thin Solid Films*, Vol. 99 p 53–59 (1983).

SUMMARY OF THE INVENTION

Accordingly, one object of the current invention is to modify phthalocyanine so that it can be used in film deposition techniques that operate with compounds soluble in organic solvents, one of which is the Langmuir-Blodgett film transfer technique.

Another object of the invention is to produce orderly films from the chemically modified phthalocyanine that have electrical and other properties similar to, and better than, those of conventional phthalocyanines.

Another object is to produce phthalocyanines suitable for Langmuir-Blodgett film transfer without the need for difficult carbon atom substitution on the phthalocyanine ring.

These and other objects are achieved by attaching aryloxy or arylthio or alkyloxy or alkylthio substitution at up to four points about the periphery of a phthalocyanine ring. The resulting compounds dissolve in organic solvents and are suitable for the making of Langmuir-Blodgett films.

DETAILED DESCRIPTION OF THE INVENTION

This invention is concerned with the preparation of phthalocyanine compounds with mono, di, tri, and tetra aryloxy, arylthio, alkyloxy, and alkylthio substitution on the phthalocyanine ring, as indicated by the structure shown in the following formula:

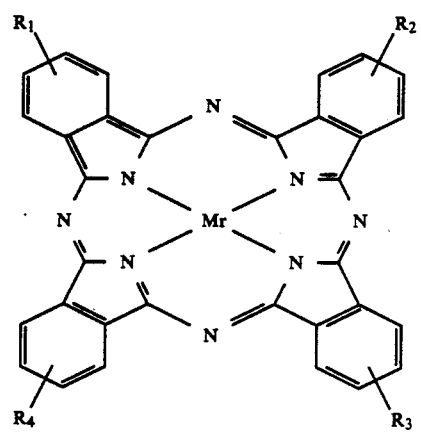

M in the formula may be a selection from among the transition metals, including Cu, Ni, Co, Pt, Mg, Zn, Pb, Bi, or Pd.

It no metal is present, r equals 0.

$R_1$, $R_2$, $R_3$, and $R_4$ may be aryloxy, arylthio, alkyloxy, or alkylthio, or hydrogen. The $R_2$ need not be identical, but, rather may be chosen from among the substituent types named above independently.

All of these compounds are within the scope of the invention, regardless of whether they have been prepared from different processes or reagents.

The compounds are prepared by reaction of aryloxy, arylthio, alkyloxy, alkylthio, or hydrogen substituted phthalonitrile with a metal or metal-salt, or with hydroquinone itself (for the case of metal-free phthalocyanine). If desired, a mixture of various phthalonitrile species may be used.

The substituted phthalocyanine compounds thus obtained are soluble in cyclic ether, chlorine, and aromatic solvents. They can be purified by conventional alumina column chromatography.

EXAMPLES

Precursor Synthesis 4-(Cumylphenoxy) 4-phthalonitrile (I). (I) was prepared by $K_2CO_3$-catalyzed nitro displacement of 4-nitrophthalonitrlile (Eastman) by cumylphenol (Aldrich) in $Me_2SO$. In a nitrogen atmosphere, 19.56 g (0.141 mol) of finely grounded anhydrous $K_2CO_3$ was added to a solution of 19.08 g (0.090 mol) of 4-cumylphenol and 15.57 g (0.090 mol) of 4-nitrophthalonitrile in 150 mL of dry $Me_2SO$ by 1-2g additions at ½ to 1-h intervals over an 8-h period. The mixture was stirred for 24 hours at 20° C. under nitrogen. The reaction mixture was worked up by filtering the undissolved salt and slowly adding the filtrate to a rapidly stirred 400-mL volume of water. The suspension was neutralized with HCl, and the crude products were taken up into 100 mL of methylene chloride and combined with two subsequent 50-ml extractions. The methyene chloride solution was then extracted with 100 ml of 5% $Na_2CO_3$ to remove unreacted phenol, washed, and dried and solvent stripped to yield 21.3 g (70%) of I. The crude product was recrystallized twice from methanol yielding large platelets; MP 90° C.; IR (KBr) 3082 w, 3059 w, 3038 w, 2976 m, 2956 w, 2872 w, 2238 m, 1531 s, 1563 m, 1502 s, 1487 s, 1313 s, 1303 s, 1288 s, 1278 s, 1255 s, 1210 s, 1176 m, 1018 m, 901 m, 861 s, 769 m, 704 $cm^{-1}$; H NMR ($CDCl_3$) 1.70 (s, 6H, methyl), 7.72 (m, 12 H, aromatic); mass spectrum, m/e 338 (calcd 338). Anal. Calcd for $C_{23}H_{18}N_2O$: C, 81.65; H, 5.32; N, 8.23. Found: C, 81.86; H, 5.28; N, 8.23. On standing for several weeks the platelet crystal turn light green which is associated with the presence of a trace quantity of occluded methanol. Recrystallization from hexane proceeds yields needle-shaped crystals, mp 90° C., which remain colorless indefinitely. Anal. Found: C, 81.72; H, 5.41; N, 8.33.

4-(Cumylphenoxy)-4-phthalonitrile is hereafter referred to as reagent (I).

PHTHALOCYANINE SYNTHESES

With the exception of the metal-free derivative, the procedures for the metallophthalocyanines are very similar and analogous to those reported by Linstead and co-workers for unsubstituted metallophthalocyanines. Since the solubility properties of the phthalocyanine products are determined by the cumylphenoxy groups, the workup and purification procedures are also very similar. The general reaction and purification procedures are as follows except where departures are specified.

To a 10×75 mm tube fitted with an 8-mm Teflon coated magnetic stirring bar were added the prescribed quantities of I and coreactant. The mixture was carefully fused under vacuum (less than 0.1 torr) to remove residual methanol occluded in I and sealed under vacuum. The entire tube was heated with stirring for the designated time and temperature. The crude product was purfied by column chromatography (neutral Woelm, activity 1) using toluene as a loading solvent and dioxane as an elution solvent. The dioxane solution was concentrated to a 2-3-mL volume, and the phthalocyanine was precipitated by dropwise addition into a stirred volume of 200 mL of methanol. The flocculent blue precipiate was filtered into the thimble of a micro Soxhlet extractor, extracted with methanol to ensure complete removal of unreacted I, and extracted into benzene. The benzene solution was concentrated to a 3-mL volume and added dropwise to 200 mL of stirred petroleum ether. The flocculent product was collected and vacuum dried (180° C./0.1 torr).

METAL-FREE TETRAKIS (CUMYLPHENOXY) PHTHALOCYANINE (II)

A mixture of 1.00 g(2.96 mmol) of I and 0.081 g (0.74 mmol) of hydroquinone (purified by sublimation) was fused by gentle heating to the melting point without vacuum, cooled, sealed under vacuum, and reacted at 180° C. for 16 h: yield 0.49 g (49%); UV-vis (dioxane) 286, 341, 390, 602, 635, 663, 697 nm; IR (supported film on NaCl) 3290 w (N-H), 3093 w, 3062 w, 3040 w, 2977 m, 2940 w, 2877 w, 1607 m, 1508 s, 1477 s, 1237 s, 1176 m, 1093 m, 1017 s ($H_2Pc$ specific band), 932 m, 830 m, 766 m, 747 s, 701 s $cm^{-1}$; H NMR ($CDCl_3$) 6.4 (br s, 2 H, internal N-H), 1.73 (s, 12 H, methyl), 7.32 (m, 24 H, aromatic); mass spectrum m/e 1355 (P+1). Anal. Calcd for $C_{92}H_{74}N_8O_4$: C, 81.51; H, 5.50; N, 8.27. Found: C, 81.61; H, 5.62; N, 8.43.

TETRAKIS (CUMYLPHENOXY) PHTHALOCANINE COPPER (III)

A mixture of 0.676 g (2.00 mmol) of I and 0.245 g(4.00 mmol) of copper bronze (Creslite) was reacted at 270° C. for 12 h: yield 0.302 g (43%); UV-vis (dioxane) 280, 347, 606, 674, nm; IR (supported film on NaCl) 3097 w, 3063 w, 3042 w, 2988 m, 2943 w, 2879 w, 1607 s, 1508 s, 1408 m, 1447 m, 1242 s, 1182 m, 1126 m, 1100 m, 969 m, 832 m, 768 m, 752 s, 704 s $cm^{-1}$; H NMR ($CDCl_3$) 1.65 (br s, 12 H, methyl), 7.25 (br s, 24 H, aromatic); ESR (1:10 $CuPcX_4$ $H_2$ $PcX_4$, toluene) g=2.34, 2.21, 2.04 (hfs), 1.96 (hfs) mass spectrum m/e 1416 (P+1).

Anal. Calcd for $c_{92}H_{72}N_8O_4Cu$: C, 78.00; H, 5.12; N, 7.91; Cu, 4.48. Found: C, 78.19; H, 50.01; N, 7.99; Cu 4.61.

TETRAKIS (CUMYLPHENOXY) PHTHALOCYANAINE NICKEL (IV)

A mixture of 0.676 g (2.00 mmol) of I and 0.245 g (4.00 mmol) of nickel powder (HCl etched, washed, and dried) was reacted at 280° C. for 44 h: yield 0.534 g (76%); UV-vis (dioxane) 290, 340, 600, 667 nm: IR (supported film on NaCl) 3096 w, 3063 w, 3039 w, 2978 m, 2940 w, 2878 w, 1608 s, 1508 s, 1477 s, 1417 m, 1242 s, 1181 m, 1127 m, 1099 m, 1021 m, 963 m, 830 m, 768 m, 756 s, 703 s $cm^{-1}$; ESR (toluene) g=2 (s, Hpp=6 G); mass spectrum, m/e 1411 (P+1).

Anal. Calcd for $C_{92}H_{72}N_8O_4Ni$: C, 78.23; H, 5.14; N, 7.93; Ni, 4.16. Found: C, 78.00; H, 5.23; N, 7.82; Ni, 3.96.

TETRAKIS (CUMYLPHENOXY) PHTHALOCYANINE PALLADIUM (V)

A mixture of 0.676 g (2.00 mmol) of I and 0.088 g (0.50 mmol) of $PdCl_2$ (Alfa) was reacted at 290° C. for 48 h: yield 0.109 g (15%); UV-vis (dioxane) 283, 329, 612, 660 nm; IR (supported film on NaCl) 3093 w, 3064 w, 3038 w, 2977 m, 2938 w, 2880 w, 1608 s, 1508 s, 1455 s, 1409 m, 1242 s, 1172 m, 1131 m, 1110 m, 832 s, 767 m, 751 m, 702 s $cm^{-1}$; ESR (toluene) g=2 (s, Hpp=8 G).

Anal. Calcd for $C_{92}H_{72}N_8O_4Pd$: C, 75.68; H, 4.97; N, 7.76; Pd, 7.29. Found: C, 75.94; H, 4.99; N, 7.35; Pd, 7.25.

TETRAKIS (CUMYLPHENOXY) PHTHALOCYANINE PLATINUM (VI)

A mixture of 1.00 g(2.96 mmol) of I and 0.20 g (0.75 mmol) of $PtCl_2$ (Alfa) was reacted at 290° C. for 48 h: yield 0.263 g (23%); UV-vis (dioxane) 278, 394, 605, 651 nm; IR (supported film on NaCl) 3096 w, 3063 w, 3040 w, 2978 m, 2940 w, 2878 w, 1608 s, 1508 s, 1475 s, 1411 m, 1242 s, 1174 m, 1136 m, 1111 m, 831 m, 768 m, 753 m, 702 s $cm^{-1}$; ESR (toluene g=2 (s, Hpp=4 G).

Anal. Calcd for $C_{92}H_{72}N_8O_4Pt$: C, 71.35 H, 4.69; N, 7.24; Pt, 12.60. Found: C, 72.31; H, 4.65; N, 7.75; Pt, 11.94.

TETRAKIS (CUMYLPHENOXY) PHTHALOCYANINE MAGNESIUM (VII)

A mixture of 0.50 g (1.48 mmol) of I and 0.14 g (5.92 mmol) of Mg powder (lightly etched with dilute HCl) was reacted at 280° C. for 70 h: yield 0.072 g(14%); UV-vis (dry dioxane) 282, 380, 615, 680 nm; IR (supported film on NaCl) 3091 w, 3061 w, 3039 w, 2976 m, 2940 w, 2878 w, 1606 s, 1508 s, 1488 s, 1237 s, 1178 m, 1085 m, 1049 m, 952 m, 832 m, 702 s $cm^{-1}$; mass spectrum, m/e 1377 (P+1).

Anal. Calcd for $C_{92}H_{72}N_8O_4Mg$: C, 80.19; H, 5.27; N, 8.13; Mg, 1.76. Found: C, 80.70; H, 5.22; N, 7.48; Mg, 1.42.

TETRAKIS (CUMYLPHENOXY) PHTHALOCYANINE COBALT (IX)

A mixture of 0.676 g(2.00 mmol) of I and 0.236 g (4.00 mmol) of Co powder (HCl etched, washed, and dried) was reacted at 280° C. for 12 h: yield 0.249 g (35%); UV-vis (dioxane) 275, 342, 603, 669 nm; Ir (supported film on NaCl) 3093 w, 3063 w, 3041 w, 2987 m, 2941 w, 2879 w, 1608 s, 1509 s, 1476 s, 1413 s, 1242 s, 1182 m, 1137 m, 1102 m, 1063 m, 1020 m, 963 m, 831 m, 767 m, 756 s, 702 s $cm^{-1}$; ESR (1:10 $CoPcX_4$: $H_2$ $PcX_4$, toluene, −90° C.) g=2.9 (eight lines); mass spectrum, m/e 1412 (P+1).

Anal. Calcd for $C_{92}H_{72}N_8O_4Co$: C, 78.23; H, 5.14; N, 7.93; Co, 4.17. Found: C. 77.77; H, 5.13; N, 7.92; Co, 4.07.

TETRAKIS (CUMYLPHENOXY) PHTHALOCYANINE ZINC (X)

A mixture of 0.676 g (2.00 mmol) of I and 0.262 g (4.00 mmol) of Zn powder (HCl etched, washed, dried) was reacted at 280° C. for 70 h: yield 0.397 g (56%); UV-vis (dioxane) 281, 350, 609, 674 nm; IR (film supported on NaCl) 3039 w, 3063 w, 3040 w, 2988 m, 2940 w, 2879 w, 1607 s, 1508 s, 1493 s, 1476 s, 1402 m, 1361 m, 1240 s, 1179 m, 1122 m, 1092 m, 1050 m, 1021 m, 952 m, 832 m, 767 m, 750 s, 703 s $cm^{-1}$, mass spectrum m/e 1417 (P+1).

Anal. Calcd for $C_{92}H_{72}N_8O_4Zn$: C, 77.87; H, 5.11; N, 7.90; Zn, 4.61. Found: C, 77.86; H, 4.85, N, 7.86; Zn, 4.58.

TETRAKIS (CUMYLPHENOXY) PHTHALOCYANINE LEAD (XI)

A mixture of 0.500 g (1.48 mmol) of I and 0.250 (1.12 mmol) of PbO (Fisher, yellow) was reacted at 210° C. for 14 h: yield 0.280 g (49%); UV-vis (dioxane) 244, 270, 339, 360 sh, 383 sh, 638, 710 nm; IR (film supported on NaCl) 3092 w, 3063 w, 3042 w, 2986 m, 2938 w, 2877 w, 1606 s, 1525 m, 1508 s, 1487 s, 1392 m, 1344 m, 1238 s, 1180 m, 1083 m, 1050 m, 950 m, 832 m, 768 m, 750 m, 702 s $cm^{-1}$; mass spectrum, m/e 1561 (P+1).

Anal. Calcd for $C_{92}H_{72}N_8O_4Pb$: C, 70.80; H, 4.65: N, 7.18; Pb, 13.27. Found: C, 70.80; H, 4.65; N, 7.18; Pb, 13.27. Found: C, 70.74; H, 4.89; N, 7.46; Pb, 13.03.

TETRAKIS (CUMYLPHENOXY) PHTHALOCYANINE BISMUTH (XII)

A mixture of 0.676 g (2.00 mmol) of I and 0.84 (4.0 mmol) of Bi powder ($HNO_3$ etched, washed, dried) was reacted at 290° C. for 150 h: yield 0.164 g (21%); UV-vis (dioxane) 287, 343, 663, 696 nm; IR (film supported on NaCl) 3093 w, 3062 w, 3040 w, 2979 m, 2940 w, 2880 w, 1606 s, 1508 s, 1478 s, 1390 m, 1330 m, 1238 s, 1179 m, 1079 m, 1020 m, 947 m, 823 m, 768 m, 743 m, 702 s $cm^{-1}$; mass spectrum, m/e 1562 (P+1).

Anal. Calcd for $C_{92}H_{72}N_8O_4Bi$: C, 70.71; H, 4.64; N, 7.17; Bi, 13.37. Found: C, 72.96; H, 5.06; N, 7.74: Bi, 12.42, 14.22.

TETRATHIOPHENOXY PHTHALOCYANINE (XIII)

A mixture of 0.280 part 4-(phenylthio) phthalonitrile and 0.073 part hydroquinone were reacted at 185° C. for 24 hours. The reaction mixture is dissolved in a minimum of chloroform, chromatographed on alumina with tetrahydrofuran elution, precipitated into methanol, soxhlet extracted with methanol and vacuum dried. The tetrathiophenoxy phthalocyanine is a blue powder.

TETRANEOPENTROXY PHTHALOCYANINE (XIV)

A mixture of 0.59 part 4-neopentoxyphthalonitrile and 0.076 part hydroquinone were reacted at 160° C. for 20 hours. The reaction mixture was dissolved in a minimum of dioxane, chromatographed on alumina, precipitated into methanol and vacuum dried. The tetraneopentoxyphthalocyanine is a purple powder.

TETRA-(OCTADECYLOXY) COPPER PHTHALOCYANINE (XV)

A mixture of 0.50 part 4-octadecyloxy phthalonitrile and 0.16 part copper bronze were reacted at 280° C. for 57 hours. The reaction mixture was dissolved in minimum of toluene, chromatographed on alumina with tetrahydrofuran elution, precipitated into methanol and soxhlet extracted with methanol. Tetra-(octadecyl) copper phthalocyanine is a blue powder which melts above 140° C.

MONOCUMYLPHENOXYPHTHALOCYANINE (XVI)

A mixture of 0.57 part 4-cumylphenoxy-4-phthalonitrile, 2.16 part phthalonitrile and 0.51 part hydroquinone was reacted at 225° C. for 4 hours. The mixture was ground, partially dissolved in tetrahydrofuran and filtered. The filtrate was chromatographed on alumina with tetrahydrofuran elution, precipated into methanol followed by methanol extraction. This production was analyzed by infrared, UV-vis and mass spectroscopy and found to be dicumylphenoxy phthalocyanine. The monocumylphenoxyphthalocyanine could be soxhlet extracted from the filtered residue with ortho dichlorobenzene.

PREPARATION OF MONOLAYERS OF SUBSTITUTED PHTHALOCYANINES

A Teflon-coated Pyrex through (11 cm×40 cm×0.5 cm) was used as the film balance tray for preparing monolayers of the metal-free and metal-substituted (cumylphenoxy) phthalocyanine and for determing their monolayer properties. Teflon-coated glass rods (15 cm×0.4 cm×0.6 cm) were used as barriers to compress the films adsorbed at the water surface and to sweep the water surface of adsorbed contaminants. A Wilhelmy plate was used to measure changes in the surface tension. The plate was of platinum, 2.0 cm×1.5 cm×0.005 cm. It was attached to a Statham UC 2 strain gauge and, via an appropriate resistance bridge circuit, to a strip chart recorder. The system can be calibrated to easily detect film pressurers of 0.05 mN/m. The movable Teflon barriers were coupled with a variable speed motor drive to permit continuous controlled compression of an adsorbed film. The rate of compression was maintained sufficiently slow so that the resulting surface tension vs. film pressure curves were independent of compression rate. The film balance system was enclosed in a Lucite box to maintain a relatively dust-free environment during the course of a run. The measurements were carried out at room temperature, 25±2° C.

Solutions of metal-free and metal-containing ($H_2$, Cu, Ni, Co, Pt, Pd) (cumylphenoxy) phthalocyanines were prepared in benzene. All glassware was acid cleaned, rinsed profusely with distilled water, and dried prior to use. Solutions were delivered to the water surface from a micrometer syringe. In these initial studies the substrate used was 0.01 N HCl.

Prior to a run the film balance was washed with a detergent, rinsed with distilled water, drained, and filled with substrate. The surface was cleaned by appropriate sweeping with the film barriers until no changes in film pressure were observed when the surface was compressed to within 0.5 cm of the Wilhelmy plate mounted 2 cm from the end of the trough. The spreading solution was added dropwise to the surface and allowed to equilibriate while the solvent evaporated, usually 10–15 min. The Wilhelmy plate was cleaned by flaming to read heat, cooled, and lowered until it just touched the surface and was wet by the substrate. The film was then compressed slowly, and the film pressure vs. area/-molecule curves were recorded. The film balance was also equipped with a motor driven dip coater to transfer Langmuir-Blodgett films to solid surfaces by lowering and raising the solid substrates through the monolayer-covered interfaces.

What is claimed and desired to be secured by Letters Patent of the United States is:

1. The compound Metal-Free Tetrakis (cumylphenoxy) phthalocyanine.

2. The compound Tetrakis (cumylphenoxy) phthalocyanine copper.

3. The compound Tetrakis (cumylphenoxy) phthalocyanine nickel.

4. The compound Tetrakis (cumylphenoxy) phthalocyanine palladium.

5. The compound Tetrakis (cumylphenoxy) phthalocyanine platinum.

6. The compound Tetrakis (cumylphenoxy) phthalocyanine magnesium.

7. The compound Tetrakis (cumylphenoxy) phthalocyanine cobalt.

8. The compound Tetrakis (cumylphenoxy) phthalocyanine Zinc.

9. The compound Tetrakis (cumylphenoxy) phthalocyanine lead.

10. The compound Tetrakis (cumylphenoxy) phthalocyanine bismuth.

11. The compound Tetrathiophenoxy phthalocyanine.

12. The compound Tetraneopentoxyphthalocyanine.

13. The compound Tetra(octadecyl) copper phthalocyanine.

14. The compound monocumylphenoxyphthalocyanine.

15. A method for preparing a phthalocyanine of the general formula:

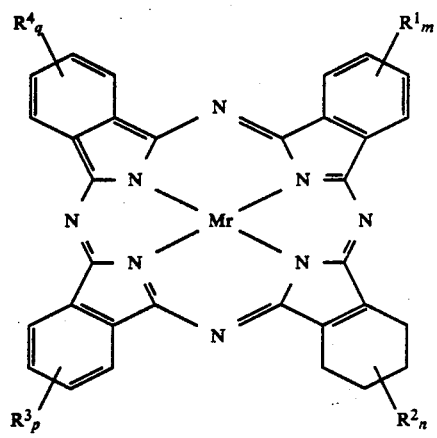

wherein $R^1$ to $R^4$ are selected from the group consisting of aryloxy, arylthio, alkyloxy and alkylthio and m, n, p, q and r are equal to 0 or 1 with the sum of m, n, p, and q being equal to at least 1; M is transition metal, which comprises the steps of:

forming a dimethyl sulfoxide solution of 4-nitrophthalo-nitrile and a reactant selected from the group consisting of aryl or alkylalcohol, aryl or alkyl sulfide and mixtures thereof:

slowly admixing anhydrous potassium carbonate into said solution under a nitrogen atmosphere until the reaction is completed;

filtering out any undissolved potassium carbonate from the reaction mixture leaving a filtrate comprising a dimethyl sulfoxide solution of an oxy or thio substituted phthalonitride or a mixture thereof;

slowly adding said filtrate to rapidly stirred water, forming a suspension;

neutralizing said suspension;

separating said oxy or thio substituted phthalonitrile;

heating said oxy or thio substituted phthalonitrile alone or with a transition metal powder or salt, thereby forming phthalocyanine;

separating said phthalocyanine.

16. The method of claim 15 wherein said aryl alcohol is cumylphenol and the transition metal is selected from the group consisting of copper, nickel, cobalt, platinum, palladium, magnesium, zinc, lead, bismuth, and mixtures thereof.

17. The method of claim 16 wherein said alkyl alcohol is selected from the group consisting of neopentanol and octadecanol.

18. The method of claim 15 wherein said aryl sulfide is phenyl sulfide.

* * * * *